United States Patent Office 2,810,737
Patented Oct. 22, 1957

2,810,737

DICYCLOPENTADIENYL GROUP VIII METAL COMPOUNDS HAVING AN ALPHA-HYDROXYALKYL SUBSTITUENT ON ONE OR BOTH OF THE CYCLOPENTADIENYL RINGS

Alfred C. Haven, Jr., Hancocks Bridge, N. J., assignor to E. I. du Pont de Nemours and Company, Wilmington, Del., a corporation of Delaware No Drawing. Application July 1, 1953, Serial No. 365,558

4 Claims. (Cl. 260—439)

This invention relates to metallo-organic compounds and, more particularly, to metallo-organic compounds of eighth group metals.

Organometallic compounds, in which the metal is directly attached to carbon of an organic radical, are of importance. Tetraethyllead is used widely as an antiknock agent in internal combustion engines. Organomercury compounds are widely used in the fungicide field, e. g., as seed disinfectants. Organomagnesium compounds are widely used in organic syntheses as are also organosodium and organolithium compounds. Very few organometallic compounds of group VIII metals have been described. Recently [Kealy and Pauson, Nature 168, 1039 (1951)] there has been disclosed a compound having two cyclopentadienyl radicals directly attached to an iron atom. This compound has been considered unique in that according to Wilkinson et al. in J. Am. Chem. Soc. 74, 2125 (1952), all five positions of the cyclopentadienyl ring in dicyclopentadienylmetallics are equivalent and no isomerism with respect to any one cyclopentadiene ring is possible. Other group VIII organometallics of cyclopentadiene have been reported. For example, the cobalt compound has been prepared by Wilkinson, J. Am. Chem. Soc. 74, 6146-9 (1952), and the nickel derivative is the subject of Thomas, U. S. patent application Ser. No. 298,170, filed July 10, 1952, now U. S. Patent No. 2,680,758, issued June 8, 1954. Wilkinson has also reported the preparation of corresponding dicyclopentadienyl derivatives of ruthenium, rhodium, iridium, and palladium.

In general the group VIII derivatives of cyclopentadiene have been prepared by the reaction of a Grignard reagent of cyclopentadiene with a group VIII metal halide under anhydrous conditions. Such a process is clearly not suitable for the preparation of cyclopentadienyl derivatives of group VIII metals which derivatives contain groups reactive with Grignard reagents. The nature of the reaction thereby excludes the preparation by this method of cyclopentadienylmetallics which contain on the cyclopentadiene ring, alkyl groups which bear active hydrogen-containing groups, e. g., the alcoholic hydroxyl group.

This invention has as an object the preparation of new organometallic compounds of group VIII metals from the class consisting of iron, cobalt and nickel. Another object is the preparation of iron, cobalt and nickel organometallic compounds containing hydroxyl groups. Other objects will appear hereinafter.

These objects are accomplished by the invention of organometallic compounds of group VIII metals from the class consisting of iron, cobalt and nickel in which the iron, cobalt or nickel is bonded to two cyclopentadienyl rings at least one of which carries an alpha-hydroxyalkyl substituent, i. e., an alkyl group with a hydroxyl on the carbon joined to cyclopentadiene ring carbon.

The compounds of the present invention can be prepared by reducing the corresponding acylcyclopentadienyl compounds of iron, cobalt or nickel either by reacting the acylcyclopentadienyl derivative of iron, cobalt or nickel with a reducing agent, or with hydrogen under superatmospheric pressure at temperatures of below 75° C. in the presence of a hydrogenation catalyst.

The following examples in which parts are by weight are illustrative of the invention:

EXAMPLE I

A. *Preparation of acetylcyclopentadienyl-(cyclopentadienyl)iron*

A mixture of 93 g. of dicyclopentadienyliron, 250 ml. of acetic anhydride and 20 ml. of 85% phosphoric acid was heated at 100° C. for 10 minutes. The reaction mixture was poured directly onto ice. After standing overnight, the mixture was neutralized with 200 g. of sodium carbonate monohydrate in 200 ml. of water. The resulting mixture was cooled in an ice bath, filtered and washed with water. The granular product was dried. Sublimation at one mm. of pressure and 100° C. gave 81.5 g. (71.4% yield) of the monoacetyl derivative as orange crystals.

B. *Preparation of cyclopentadienyl($\alpha$-hydroxyethylcyclopentadienyl)iron*

In a four-necked, one-liter flask equipped with a reflux condenser (protected from the atmosphere by means of a calcium chloride tube), a nitrogen inlet, a paddle stirrer and a dropping funnel, was placed 22.8 g. (0.10 mole) acetylcyclopentadienyl(cyclopentadienyl)iron prepared as described above and 500 ml. anhydrous ether. The mixture was stirred and treated dropwise with a suspension of 1.90 g. (0.05 mole) of finely-ground lithium aluminum hydride in 100 ml. of anhydrous ether. After the addition was complete, the mixture was heated under reflux with stirring for two hours. A solution of 20 ml. of ethyl acetate in 50 ml. of ether was added to destroy the excess lithium aluminum hydride. The suspension was then cooled in an ice-bath and treated with 26.8 g. (0.5 mole) of ammonium chloride in 50 ml. of water. After having been stirred one-half hour at 0–5° C., the reaction mixture was filtered and the organic layer of the filtrate separated. It was washed twice with 100 ml. portions of water, dried with sodium sulfate and concentrated at 10 mm. to an oil which crystallized on cooling. The cyclopentadienyl($\alpha$-hydroxyethylcyclopentadienyl)iron obtained had a M. P. 69–72° C. After recrystallization from a mixture of ether and petroleum ether, a M. P. 73–75° C. was observed.

*Analysis.*—Calculated for $C_{12}H_{14}OFe$: C, 62.63%; H, 6.13%. Found: C, 63.07, 63.05%; H, 6.13, 6.09%.

The infrared absorption spectrum showed no carbonyl and strong hydroxyl absorption.

EXAMPLE II

A solution of 5 g. acetylcyclopentadienyl(cyclopentadienyl)iron, prepared as in Example I(A) above, in 100 cc. methanol was agitated under 2000 lbs./in.$^2$ hydrogen pressure in the presence of a catalytic amount of Raney nickel at 50° C. for about one-half hour. The reactor was cooled to room temperature, and unreacted hydrogen vented. The catalyst was filtered from the solution of the product and the solvent removed in a stream of air at room temperature. The yellow crystals deposited were recrystallized from low boiling petroleum ether to give about 5 g. of yellow needles, M. P. 76–77°, whose melting point was markedly depressed on admixture with the starting material. The material showed absorption in the infrared corresponding to the loss of a carbonyl group in the acetyl derivative and the formation of a hydroxyl group.

*Analysis.*—Calculated for $C_{12}H_{14}OFe$: C, 62.63%; H. 6.13%; Fe, 24.27%. Found: C, 62.21, 62.88%; H. 6.16, 6.16%; Fe, 24.2%.

EXAMPLE III

A. *Preparation of cyclopentadienyl(formylcyclopentadienyl)iron*

A mixture of 74.1 g. of dicyclopentadienyliron, 122 g. of phosphorus oxychloride and 54 g. N-methylformanilide was heated to 50° C. and maintained, by occasional cooling, at 50–55° C. for two hours. After standing at room temperature for 15 hours, the reaction mixture was reheated to 55–60° C. for 30 minutes. After cooling, the viscous mixture was poured onto ice and the resulting aqueous mixture partially neutralized with 250 g. of sodium acetate trihydrate. This mixture was then extracted for 45 hours with diethyl ether in a continuous extractor. The ether extracts were washed with water, 5% sodium carbonate solution and again with water. The ether solution was dried over anhydrous magnesium sulfate, filtered and the filtrate evaporated. There was obtained 58.5 g. of crude solid, which on sublimation at one mm. of pressure and 70° C. gave 55.5 g. of red-brown crystalline compound which was recrystallized from an n-heptane/methylene chloride mixture.

B. *Preparation of cyclopentadienyl(hydroxymethylcyclopentadienyl)iron*

Using the general procedure of Example I(B), a solution of 10.7 g. of cyclopentadienyl(formylcyclopentadienyl)iron in 250 ml. anhydrous ether was reduced with 1 g. of lithium aluminum hydride. There was obtained 9.5 (88% yield) of cyclopentadienyl(hydroxymethylcyclopentadienyl)iron. After recrystallization from a mixture of petroleum ether/chloroform there was obtained 5.1 g. of long glistening yellow needles which had a M. P. of 74–76° C. Infrared analysis showed hydroxyl group but no carbonyl.

*Analysis.*—Calculated for $C_{11}H_{12}OFe$: C, 61.14%; H, 5.60%; Fe, 25.85%; mol. wt., 216. Found: C, 60.86%; H, 5.72%; Fe, 26.01%; Mol. Wt., 225.

The above examples illustrate the invention as applied to the reduction of acyldicyclopentadienylirons but the invention is generic to the preparation of alpha-hydroxyalkylcyclopentadienyl derivatives of eighth group metals from the class consisting of iron, cobalt and nickel. The compounds of this invention have two cyclopentadienyl radicals attached to one eighth group metal from the class consisting of iron, cobalt, and nickel. To at least one of these cyclopentadienyl radicals there is attached an alpha-hydroxy alkyl radical, i. e., an alkyl radical with a hydroxyl group on the carbon attached to cyclopentadienyl ring carbon. The alkyl group attached to the carbon bearing the hydroxyl has at least one carbon, and preferably not over four carbons. Examples of compounds embraced by this invention include bis(α-hydroxyethylcyclopentadienyl)iron, bis(α-hydroxybutylcyclopentadienyl)iron, cyclopentadienyl(α-hydroxyethylcyclopentadienyl)iron, bis(α-hydroxyethylcyclopentadienyl)nickel, bis(α-hydroxyethylcyclopentadienyl)cobalt chloride, cyclopentadienyl(hydroxymethylcyclopentadienyl)nickel.

The hydroxyalkyl compounds of this invention are obtained by the reduction of the corresponding carbonyls aldehydes and ketones). These carbonyls are obtained by the direct acylation of the dicyclopentadienylmetallic compound by means of a Friedel-Crafts catalyst (Weinmayr, Ser. No. 312,852, now abandoned, and Woodward et al., J. Am. Chem. Soc. 74, 3458 (1952) disclose the preparation of mono- and poly-acyldicyclopentadienyliron compounds). The formyl derivative of dicyclopentadienyliron can be prepared from dicyclopentadienyliron and N-methyl formanilide by the process of Graham Ser. No. 360,370 filed June 8, 1953. The reduction of these acyl compounds to produce the corresponding α-hydroxyalkyldicyclopentadienyliron derivatives is effected under relatively mild conditions with a reduction catalyst, such as a Raney nickel catalyst or a copper chromite catalyst. When the temperature of the hydrogenation is permitted to exceed about 75° C., the yield of the α-hydroxy compound decreases with the formation of the fully hydrogenated alkyl derivative, particularly from alpha acyls having at least two carbons. For this reason, it is preferred that the temperature be kept below 75° C., and preferably within the range of about 30 to 70° C., particularly when nickel is the catalyst. Other reduction means, e. g., aluminum isopropoxide, sodium and alcohol, sodium borohydride, lithium hydride, etc., can be likewise used to obtain the hydroxyalkyl derivative from the acyl.

The hydroxyalkyl dicyclopentadienyl derivatives of iron, cobalt and nickel of this invention are useful as anti-knock agents in spark ignition fuels. Another use for these compounds resides in their activity against fungi and other microorganisms. The hydroxyl group which is a potentially active group offers a position for further chemical reaction, for example, through the formation of esters, ethers, and other hydroxyl derivatives. This is to be contrasted to the relatively stable and inert parent compounds, i. e., the dicyclopentadienylmetallics of iron, cobalt and nickel.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Cyclopentadienyl(α-hydroxyethylcyclopentadienyl)iron.

2. Cyclopentadienyl(hydroxymethylcyclopentadienyl)iron.

3. A dicyclopentadienyliron having, as its only substitution, from one to two α-hydroxyalkyl groups, each of not more than four carbons, with the proviso that there is not more than one such group on each cyclopentadienyl ring.

4. An organometallic compound wherein an eighth group metal selected from the class consisting of iron, cobalt and nickel is bonded to two cyclopentadienyl radicals having as their only substitution, from one to two α-hydroxyalkyl groups, each of not more than four carbons, but not more than one such group on each cyclopentadienyl ring.

References Cited in the file of this patent

UNITED STATES PATENTS

| | | |
|---|---|---|
| 2,680,756 | Pauson | June 8, 1954 |
| 2,683,157 | Weinmayr | July 6, 1954 |
| 2,694,721 | Weinmayr | Nov. 16, 1954 |

OTHER REFERENCES

Woodward et al.: J. Am. Chem. Soc., vol. 74, pages 3458–59.